W. H. CRAMER.
LAWN MOWER REEL.
APPLICATION FILED MAR. 16, 1909.
980,072.
Patented Dec. 27, 1910.
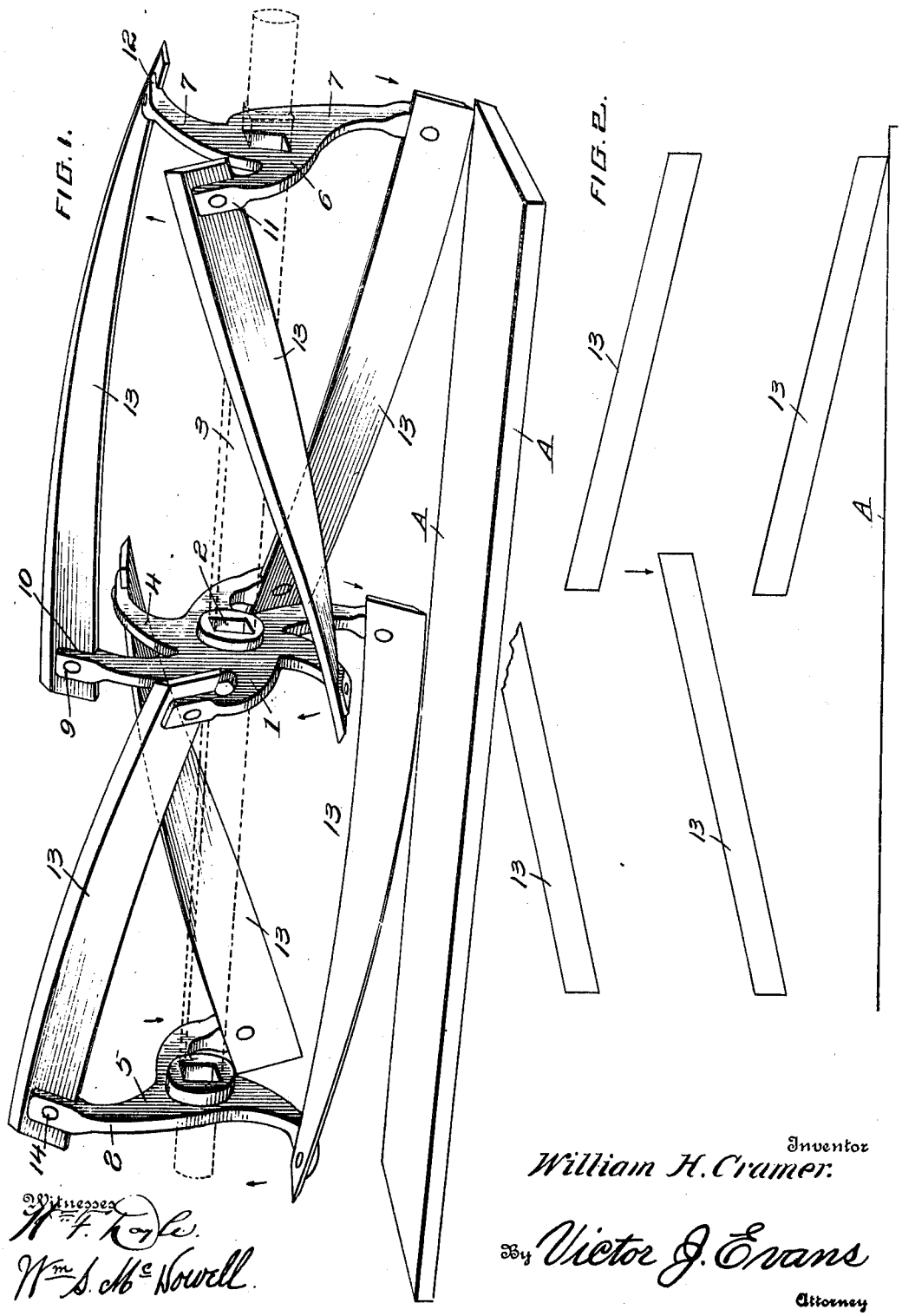
Inventor
William H. Cramer.
By Victor J. Evans
Attorney
Witnesses

UNITED STATES PATENT OFFICE.

WILLIAM H. CRAMER, OF OTTAWA, KANSAS.

LAWN-MOWER REEL.

980,072.

Specification of Letters Patent.  Patented Dec. 27, 1910.

Application filed March 16, 1909.  Serial No. 483,715.

*To all whom it may concern:*

Be it known that I, WILLIAM H. CRAMER, a citizen of the United States, residing at Ottawa, in the county of Franklin and State of Kansas, have invented new and useful Improvements in Lawn-Mower Reels, of which the following is a specification.

This invention relates to lawn mowers, and more particularly to reels therefor, and has for an object to provide a reel having longitudinally extending cutting knives or blades, the said blades or knives being arranged in groups at the sides of the vertical center line of the reel and to arrange the knives or blades of one group with respect to those of the adjacent group so that when the reel is revolved, the knives or blades of one group will be brought into operation independently of those of the other group, thus allowing the reel to be operated with little or no resistance, the arrangement of the knives further providing means whereby during operation of the reel a continuous cut is made from the ends of the reel toward the center thereof.

A still further object of my invention is to provide a reel of the character set forth having a plurality of cutting knives arranged when the reel is in operation to evenly distribute cut grass or material and throw it to the center of the swath, and away from uncut grass.

Other objects and advantages will be apparent as the nature of the invention is better set forth, and it will be understood that changes within the scope of the claim may be resorted to without departing from the spirit of the invention.

In the drawing, forming a portion of this specification and in which like numerals of reference indicate similar parts in the several views:—Figure 1 is a perspective view of my improved reel showing the position of the knives with respect to the bed knife. Fig. 2 is a diagrammatic plan view of the cutting knives.

Referring now more particularly to the drawing and with particular reference to Fig. 1 thereof, there is shown a reel embodying a centrally disposed wheel or member 1 provided with a centrally located horizontally disposed squared aperture 2 for receiving the shaft 3. The wheel or member 1 is provided with a series of radially extending arcuate arms 4, six of said arms being shown in the drawing, but it will be understood that any desired number may be employed. The shaft 3 has mounted thereon a pair of end members 5 and 6, the member 6 having a plurality of radially extending arcuate arms 7, three of such arms being shown in the present instance. The member 5 which is identical in construction with the member 6 is also provided with a plurality of radially extending arcuate arms 8. The construction herein described is such that the number of arms carried by the member 1 exceeds the number carried by the members 5 and 6 so that the alternate arms 4 of the member 1 are arranged between the arms of the members 5 and 6 for a purpose to be hereinafter more fully described. The outer ends of the arms 4 are flattened as shown at 9 and at one side these arms are rabbeted as illustrated at 10. The outer ends of the arms 7 and 8 of the members 5 and 6 are also flattened as shown at 11 and rabbeted at one side as at 12.

Cutting blades or knives 13 are provided and are connected by means of rivets or suitable fastening devices 14 to the flattened outer ends of the arms of the members 1, 5 and 6 as clearly illustrated in Fig. 1 of the drawing. The inner ends of the blades or knives 13 which are secured at their outer ends to the member 5 are secured to the alternate arms 4 of the member 1, this construction and arrangement of parts being provided so that the blades are disposed diagonally with respect to the longitudinal axis of the shaft 3. The construction is thus such that two groups of cutting knives are provided, the knives of one group at one side of the member 1 being arranged at an opposite angle to those of the knives of the other group so that when in operation of the reel, only one knife of each group will be in operation at a time, but in view of this construction a continuous cut can be obtained as it will be obvious upon reference to Fig. 1 of the drawing that when the knife of one group leaves in movement of the reel the bed knife A of the adjacent or neighboring knife of the adjacent group of blades will immediately follow the action of the preceding knife of the first named group as will be fully understood without further description. The knives of each group are arranged in parallel relation to each other as shown in Fig. 2 of the drawing, and in view of the fact that the knives of one group are arranged at an angle opposite to the angle of the knives of the adjacent group the material or cut grass will be delivered toward the center of the mower and in line with the swath and will not be thrown onto the grass which has not been operated upon by the apparatus. The spider 1 has the outer extremities of its arms alternately bent in opposite directions. The outer extremities of the spiders 5 and 6 have their outer extremities offset to correspond with the offset extremities of the intermediate spider whereby when the blades are secured to the offset portions those of one group will be arranged at an angle to those of the other group.

I claim:

In a reel for lawn mowers, a shaft, a pair of end spiders mounted on the shaft to rotate therewith, an intermediate spider mounted on the shaft to rotate therewith and having arms equaling in number the arms of both of the end spiders and constructed to provide corresponding arms for the arms of the end spiders and extending in the same general direction from the shaft, and cutting blades, each secured at its inner end to an arm of the intermediate spider next adjacent and in rear of the arm of the intermediate spider which extends in the same general direction from the shaft in which the arm of the end spider to which the outer end of the blade is attached extends, and fastenings extending through the extremities of the arms of the spiders and through the blades.

In testimony whereof I affix my signature in presence of two witnesses.

WILLIAM H. CRAMER.

Witnesses:
J. N. VOIERS,
J. V. MITCHELL.